United States Patent [19]
Kohlhagen

[11] 3,740,629
[45] June 19, 1973

[54] A.C. MOTOR DRIVE CIRCUIT
[76] Inventor: Walter Kohlhagen, 818 Oakley Avenue, Elgin, Ill. 60120
[22] Filed: Mar. 11, 1971
[21] Appl. No.: 123,304

Related U.S. Application Data
[63] Continuation-in-part of Ser. No. 57,495, July 23, 1970, abandoned.

[52] U.S. Cl. ............... 318/138, 318/166, 318/181, 318/193
[51] Int. Cl. ............................................. H02p 7/00
[58] Field of Search ............................ 318/138, 254

[56] References Cited
UNITED STATES PATENTS
3,379,946 4/1968 Croymans ......................... 318/138

Primary Examiner—Bernard A. Gilheany
Assistant Examiner—Thomas Langer
Attorney—Lowe & King

[57] ABSTRACT

A synchronous self-starting motor is driven with constant rotational velocity in response to current fed to an excitation winding thereof from a D.C. power source. Switch means is responsive to gating voltages derived from a time reference source having first and second consecutive time periods. During the two time periods, current is smoothly flowing with constantly changing slope in a series circuit including the excitation winding and a capacitor. The relative length of each period and the natural frequency of the drive circuit and excitation winding are equal to or less than the average frequency of the time reference source to achieve a sine-like voltage waveform across the capacitor. The switching means can be either like or complementary type transistors, having the ability to conduct current in either direction when forward biased, as well as electromechanical switches or vacuum tubes with shunting diodes. A flywheel is freely mounted relative to the motor shaft to assist in maintaining constant rotational velocity of the shaft. The first and second time periods can be of the same duration or of different durations as long as approximately the same force is applied to the motor rotor during each period. the same force is applied to the motor rotor during each period.

26 Claims, 12 Drawing Figures

Patented June 19, 1973
3,740,629
4 Sheets-Sheet 1
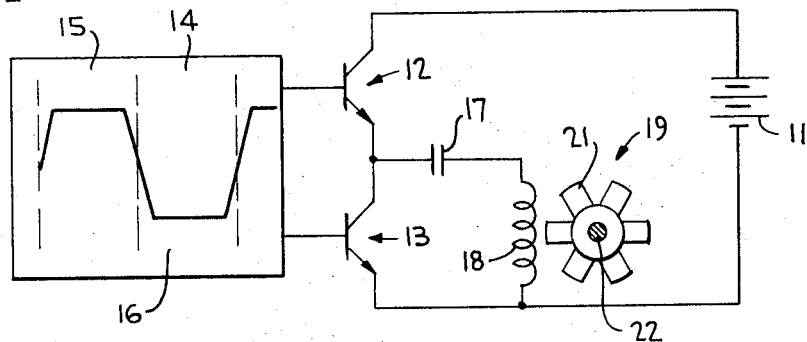
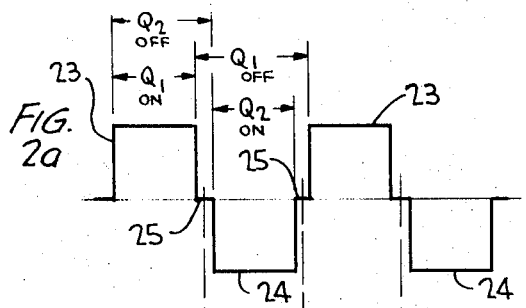
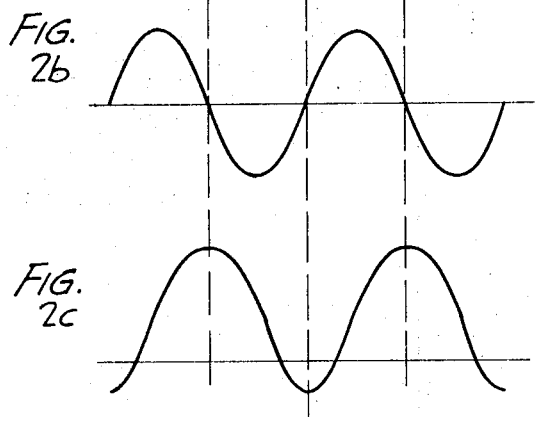
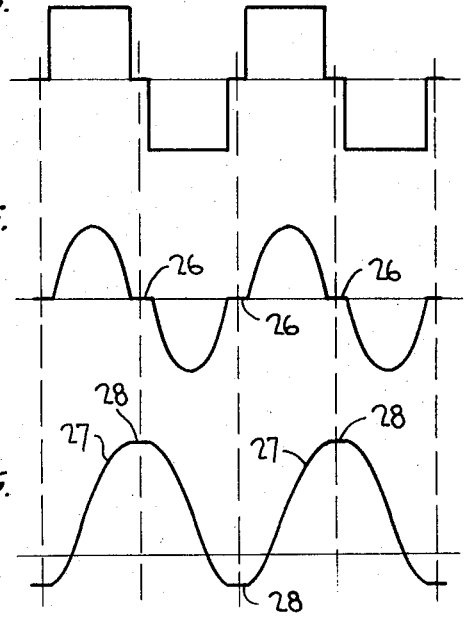
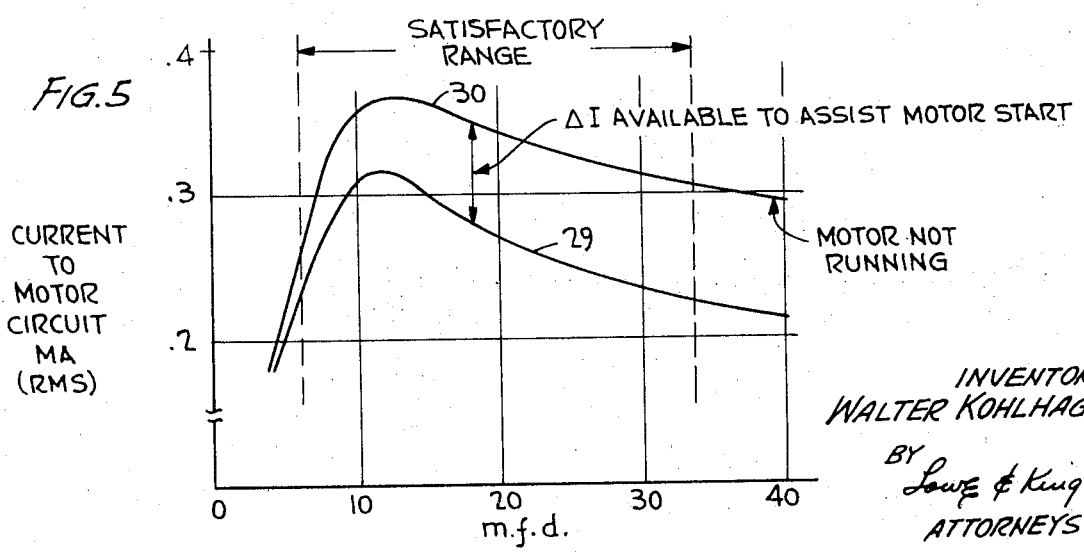
INVENTOR,
WALTER KOHLHAGEN
BY
Lowe & King
ATTORNEYS $\dfrac{E_{11}}{2}$

INVENTOR,
WALTER KOHLHAGEN

BY Lowe & King
ATTORNEYS

Patented June 19, 1973

INVENTOR,
WALTER KOHLHAGEN
BY Lowe & King
ATTORNEYS

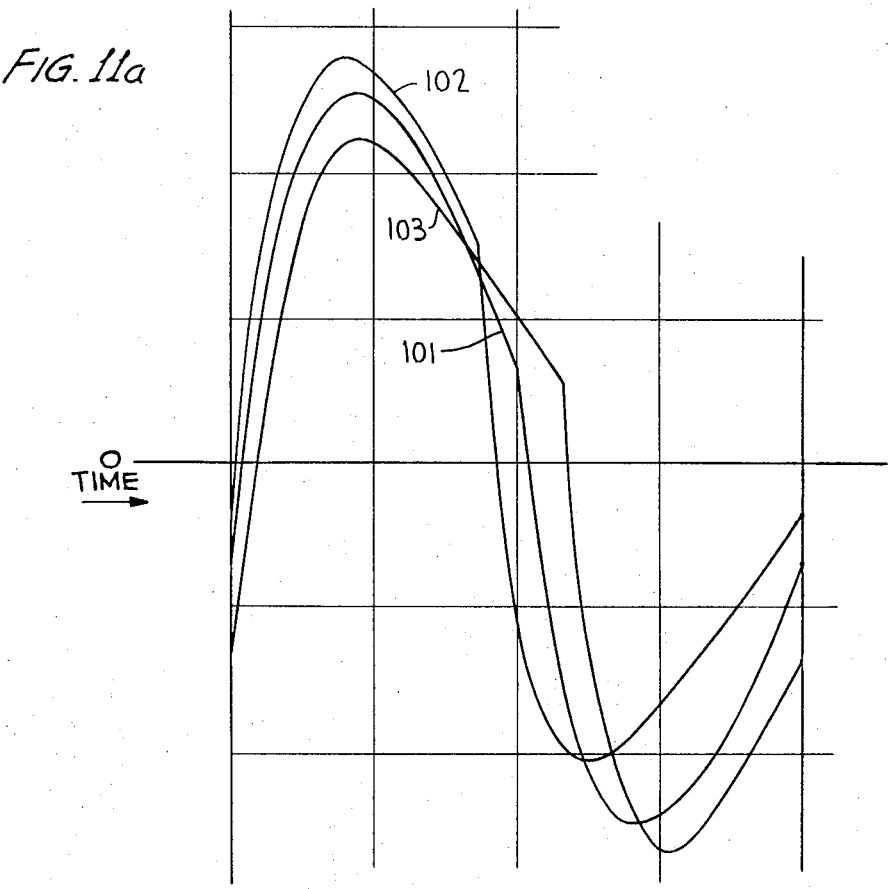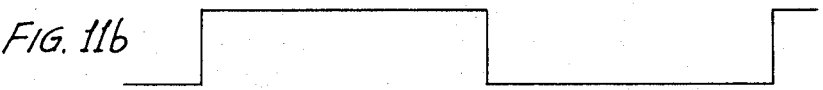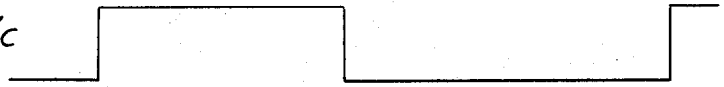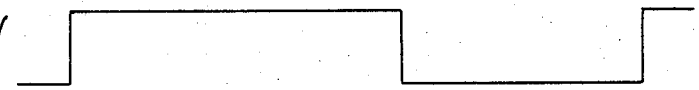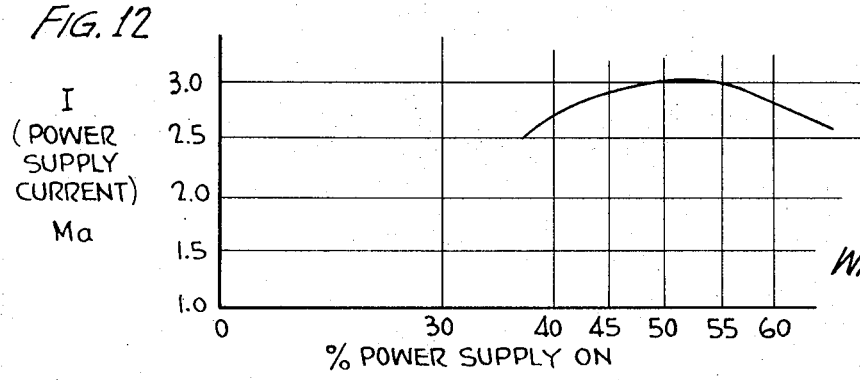

A.C. MOTOR DRIVE CIRCUIT

This application is a continuation-in-part of my co-pending application, Ser. No. 57,495, filed July 23, 1970, entitled A.C. MOTOR DRIVE CIRCUIT and now abandoned.

The present invention relates generally to drive circuits for synchronous motors and, more particularly, to a synchronous motor driven through a switching means by a DC source, wherein a capacitor is connected in series with motor excitation winding means and the natural frequency of a circuit including the winding means and capacitance is equal to or less than the average frequency of the switching means.

Several proposals have been made to drive synchronous motors in response to power from a DC source. In general, these proposals have involved connecting a DC to AC inverter circuit between a DC power supply and an excitation winding of the motor. The prior art proposals have been generally beset by certain problems to preclude wide acceptance thereof, particularly in fields wherein a synchronous motor shaft must be driven with substantially constant rotational velocity over widely varying environmental conditions, such as exists with regard to automobile clocks. For proper running of synchronous motors, particularly synchronous motors driving automobile clock mechanisms, shaft angular velocity is preferably maintained substantially constant to minimize wear, and prevent noise due to poor meshing of gears in a drive train between the shaft of the motor and the clock hands. If a synchronous motor shaft runs at variable rotational velocities, the motor is more likely to drop out of synchronism, even though driven with periodic current pulses. Further, the drive mechanism between the motor shaft and clock hands is extremely susceptible to shock when driven at variable rotation rates.

In the automobile clock field, it is necessary to provide a motor capable of properly functioning over a temperature range of −40°F. to +175°F. in response to DC voltages having a wide range of variation. Automobile electric clocks are also presently required to be self-starting. In a mass production field, such as automotive clocks, cost is of paramount importance, necessitating the use of components having extremely wide tolerances, on the order of from −20 to +100 percent from a specified value. Another important requirement of automobile clock motors, and other synchronous motors wherein a substantially constant shaft rotational velocity is required, concerns efficiency, whereby power drawn from a source is minimized.

In accordance with the present invention, there is provided a synchronous motor drive circuit enabling the above-named features to be attained. The drive circuit includes switch means, preferably of the solid state, transistor type, connecting a series circuit including a capacitor and the motor excitation winding with a DC source. The transistor switches are activated in response to gating voltages derived from a reference time source for deriving a predetermined average output frequency controlling the motor shaft speed. The reference time source is connected to the switches so that, during alternate periods, i.e., half cycles, of the time source output, current generally flows in opposite directions in the series circuit, although there usually is a slight reversal of current during each period. The first and second time periods may have substantially the same duration so that the current waveshape during each of the periods is substantially the same, with the same maximum current being attained during each time period. In the alternative, the durations of the first and second time periods may differ from each other materially with a resulting change in the waveshape ad peak value of the current in each period, as long as the force applied to the rotor is approximately the same during each full cycle of the reference time source output.

I have found through experimentation that selecting the circuit natural frequency, determined by the capacitance of the capacitor, the inductance of the excitation winding, and the circuit resistance, to be less than or equal to the average frequency of the reference time source enables smooth current waves to be applied to the excitation winding during each half cycle and a sine wave like voltage to be developed across the capacitor. Thereby a synchronous motor rotor is driven with constant rotational velocity. (In the present specification and claims the term "constant rotational velocity" as applied to the motor rotor or shaft is used in the manner normally associated with the rotational velocity of the rotor or shaft of a properly operating single phase synchronous motor of the same type as the motor employed herein.) By selecting the natural frequency to be equal to or less than the reference time source average frequency the current waveform in the series circuit has a single peak during each period, and the current between alternate ones of the peaks always slopes in the same direction with a nonzero constantly changing slope, whereby the current waveshape can be considered as an analytic function during each period. Experimentation has shown that if the recited requirements for the current waveform are not met a synchronous motor shaft does not have a constant rotational velocity, and in many instances fails to rotate.

I am unable to explain the reason why a synchronous motor shaft fails to turn or is driven with a variable rotational velocity when the described current waveforms do not exist. I speculate, however, that with the described current waveforms, the current applied to the excitation winding resembles, in many regards, a sinusoid, a waveshape that promotes proper synchronous motor operation. When the circuit natural frequency is greater than the average time reference frequency, I found that the current waveform has a constant slope between peaks. The constant slope of the current waveform occurs when no current flows in the series circuit during a substantial portion of the time interval between adjacent peaks to produce a sudden flux change followed by a zero flux change. A sudden flux change followed by a zero flux change is not conductive to constant angular velocity, i.e., smooth rotation, of a synchronous motor shaft, resulting in the shaft either turning erratically during each time period, or not turning at all.

To attain synchronous motor self-starting and enable the motor to receive sufficient flux to be driven it is necessary for the current flowing in the motor excitation winding during each time period to attain a predetermined level. In order for the current to attain the predetermined amplitude necessary for starting during each time period, the relative values of the excitation winding inductance, capacitor capacity, circuit resistance and the duration of each time period must be properly selected. If the values of the inductance, resistance and capacity are excessively great, the current in the excitation winding during each time period does not reach a value sufficient to cause motor self-starting.

In a typical circuit, capacitors for commercial use have wide tolerances and large temperature coefficients. For a typical circuit of the present invention, desired motor operation in response to a reference time frequency of 30 Hertz can occur if the value of capacitance varies from 6 microfarads to approximately 35 microfarads, assuming a motor having an excitation winding inductance of approximately 2.8 henrys. This is a capacitance variation of 500 percent, sufficient to enable the circuit to function over a wide temperature range, with components having poor tolerance, and thereby low cost. Wide tolerances in the inductance of the coil and resistance of all circuit elements can be tolerated while achieving satisfactory circuit operation.

In accordance with certain embodiments of the invention, the DC power supply and motor excitation winding are connected in circuit with each other during only one of the time periods. During the second time period energy in the excitation winding and capacitor is dissipated, whereby current is applied by the battery to the excitation winding for approximately one-half of the total operating time of the circuit. By feeding current from the DC source to the motor excitation winding only approximately one-half of the time, efficiency of the unit is enhanced. For most circuit parameters current is supplied from the capacitor to the DC source during a small portion of the time while they are connected with each other, i.e., current flows in both directions between the source and load during each of the first-named periods. Thereby, the average current drawn from the DC supply is reduced to further increase circuit efficiency. For a circuit having a capacitor of 20 microfarads and the previously stated parameters, the current required of a 6 volt DC source to operate a synchronous motor is on the order of 2 milliamperes.

To maintain the requirement for current flows of the desired waveshape during each time period, bidirectional current flow through each switching element is preferably. With most semiconductor switches, e.g., bipolar or metal oxide semiconductor field effect transistors, I found no problems exist with bidirectional current flow. With vacuum tube switches, however, current can flow in only one direction. To cure this problem, a diode with conducting properties reversed from those of the tube is connected in shunt with the tube anode cathode path. If electromechanical switches are employed, they are shunted with diodes because proper circuit and motor operation requires both switches to be simultaneously open circuited. With electromechanical switches simultaneous open circuiting can be attained only by sequential operation whereby a time gap between successive switch closures occurs. Properly poled shunt diodes enable smooth currents to flow in the excitation winding; without these diodes abrupt changes in the excitation current occur to preclude desired operation.

Relatively large efficiencies are also attained with the circuit of the present invention because the motor can be driven in response to waves having a relatively low frequency, on the order of 30 Hertz, for example. Low frequency operation is highly advantageous because eddy current and hysteresis losses are a direct function of operating frequency.

A circuit configuration similar to that which I employ is disclosed in U. S. Pat. No. 3,379,946 to Croymans. In the Croymans patent, there is disclosed a series circuit including a synchronous motor excitation winding and a capacitor. The series circuit is alternately connected by switch means to a DC source and a discharge path. In the circuit of the Croymans patent, however, there is no disclosure of any particular relationship between the length of the time periods during which current is supplied to the excitation winding and the circuit natural frequency. In the Croymans patent there is no disclosure nor suggestion of driving the motor shaft at a constant rotational velocity. In fact, a close reading of the Croymans patent reveals that the motor rotor is moved in steps, rather than continuously at a substantially constant rotational velocity. There is no indication in the Croymans patent that the relative capacity of the capacitor, inductance of the winding, and the length of time current is supplied to the series circuit are such that a current waveform between a pair of adjacent peaks is smooth and can be considered an analytic function, as in my circuit.

A further feature of the present invention concerns the use of a flywheel, serving as an inertia disc, mounted freely relative to the motor shaft. The flywheel enables the motor to be started with reduced current over configurations not including the flywheel and is of particular importance in embodiments including time reference sources having unequal successive time periods.

Still another feature of the invention is that the same circuit and DC source can be employed to drive a pair of synchronous motors in parallel. This is of particular importance with regard to synchronous clock motor applications so that different clocks driven by the same source remain in time even though they have diverse locations. By proper selection of the value of the capacitor in the series circuit, capacitors having the same value can be used to efficiently drive a load including either one or two windings in parallel.

It is, accordingly, an object of the invention to provide a new and improved switching drive circuit, including a DC power source, for feeding sine-wave-like currents to the excitation winding of a synchronous motor.

Another object of the invention is to provide a new and improved drive circuit responsive to a DC source, which circuit feeds a continuous, smoothly varying current to a synchronous motor via a pair of switches and wherein the current remains smooth even though both switches are momentarily open circuited.

It is another object of the present invention to provide a new and improved circuit for driving the rotor of an AC synchronous motor with constant rotational velocity from a DC source.

Another object of the present invention is to provide a new and improved synchronous motor drive circuit responsive to a DC power supply source wherein the motor is self-starting.

Another object of the invention is to provide a asynchronous motor drive circuit responsive to a DC source wherein relatively wide variations of the DC source potential can be tolerated.

A further object is to provide an efficient DC powered drive circuit for either one or two synchronous motor windings wherein the drive circuit components remain substantially the same regardless of the number of windings and synchronism between the motors is maintained even though one is remote from the other.

Still another object of the present invention is to provide a new and improved AC synchronous motor drive circuit responsive to DC sources, wherein components within the drive circuit can vary over wide ranges, thereby have relatively low tolerances and be capable of wide temperature variations.

Still another object of the invention is to provide a new and improved drive circuit responsive to a Dc source for activating AC motors with great efficiency.

Yet another object of the invention is to provide a new and improved, low cost, highly efficient drive circuit particularly adaptable for automobile synchronous motor clocks.

The above and still further objects, features and advantages of the present invention will become apparent upon consideration of the following detailed description of several specific embodiments thereof, especially when taken in conjunction with the accompanying drawings, wherein:

FIG. 1 is a circuit diagram of one embodiment of the present invention;

FIGS. 2 and 4 illustrate waveforms helpful in describing the operation of one embodiment of the circuit of FIG. 1 under proper operation conditions;

FIG. 3 is a series of waveforms useful for describing conditions in the circuit of FIG. 1 when it is not properly operating;

FIG. 5 is a plot of the magnitude of RMS current applied to the motor of the circuit of FIG. 1, under differing values of capacitance;

FIG. 11 illustrates waveforms helpful in describing the operation of a second embodiment of the circuit of FIG. 1; and FIG. 12 is a plot of duty cycle variation versus current derived a power supply in accordance with the embodiment of FIG. 11.

Figure 4A:
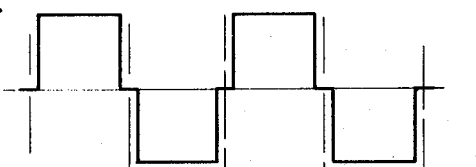

Reference is now made to FIG. 1 of the drawings wherein there is illustrated a DC source 11, which may take the form of a 12 volt automobile battery in one particular use of the invention. Connected in series with the terminals of DC source is a switch means comprising bipolar NPN transistors 12 and 13. The collector of transistor 12 is connected to the positive electrode of DC source 11, while the emitter of transistor 13 is connected to the negative electrode of the DC source. The emitter of transistor 12 is connected directly to the collector of transistor 13. The bases of transistors 12 and 13 are driven with opposite polarity, complementary gating voltages derived from time reference source 14.

Time reference source 14 is a constant frequency source generating, in one exemplary configuration, a trapezoidal waveform having equal duration first and second successively occurring periods or half cycles 15 and 16. As indicated in detail infra, the successively occurring periods need not be of equal duration. (It is to be understood that the term "half cycle" with respect to reference time sources having unequal first and second periods refers to the first and second periods even though the periods have durations materially different from one-half cycle of the total period of the reference time source.) The maximum voltage attained during each of periods 15 and 16 is substantially the same, but of opposite polarity. The maximum voltage generated by source 14 during each of time periods 15 and 16 is maintained throughout the vast majority of each of the time periods, on the order of 95 percent. Transitions between the maximum voltages derived during time periods 15 and 16 can generally be considered as straight line variations. In one typical embodiment, time reference source 14 includes a fixed frequency oscillator, for example of the tuning fork type, which drives frequency division and waveshaping circuitry. The output frequency of reference time source 14 is appropriately selected depending upon the load; one typical frequency is 30 Hertz, whereby the duration of each of time periods 15 and 16 is on the order of one-sixtieth of a second.

The out of phase voltages applied by time reference source 14 to the bases of transistors 12 and 13 gate one of the transistors into a conducting, low impedance turn-on state to the exclusion of the other. Because of the finite slope between the maximum amplitudes of the voltages generated during time periods 15 and 16 transistors 12 and 13 are never simultaneously conducting. In contrast, in the illustrated configuration there is a slight time gap between turn-off of transistor 12 and turn-on of transistor 13 and vice versa; in many instances source 14 can be of the square wave type, as long as transistors 12 and 13 are never both conducting at the same time. Each of transistors 12 and 13 conducts for the same time interval during each complete 30 Hertz period of source 14.

Connected between the common junction of the emitter of transistor 12 and collector of transistor 13 is a series circuit including capacitor 17 and excitation winding 18 of synchronous motor 19 which may be a hysteresis motor or reaction motor with or without enabling poles or phase shifting. In certain situations, particularly in conjunction with automobile clock applications, wherein cost is a paramount consideration, means without shading poles or phase shifting are employed. In one embodiment, the motor 19 includes a permanent magnet rotor 21 for driving shaft 22 and is of the type disclosed in my U.S. Pat. No. 3,322,987.

In operation, transistor 12 is biased to a closed switch condition in response to the output of source 14 during the portion of time period 15 while maximum voltage is derived from time reference source 14. While the bias of source 14 activates transistor 12 to a closed switch condition, the source applies an opposite polarity bias to the base of transistor 13 to drive transistor 13 to an open circuit condition. Prior to and after the maximum voltage during time period 15 being achieved, transistor switch 12 is also open circuited.

While switch 12 is closed, current is supplied from the positive electrode of DC source 11 through the transistor 12 emitter collector path to capacitor 17 and excitation winding 18. The capacitance of capacitor 17 and inductance of winding 18, including the effect thereon of rotor 21 and other magnetic elements coupling the excitation coil and rotor together, are such that a single peak current is developed in the excitation winding approximately in the middle of the period while switch 12 is closed. The flow of current through capacitor 17 and winding 18 throughout time period 15 is continuous with a waveform having constantly changing slope.

During half cycles 16, switch 13 is closed and switch 12 is open circuited. Thereby, a discharge path is established through the emitter collector path of transistor 13 for energy stored in capacitor 17 and coil 18 during the previous half cycle. The impedance of the discharge path is substantially the same as the impedance of the charging path through transistor 12 during time period 15, whereby the current waveshape during the discharge time period 16 is substantially the same as the current waveshape during the charging time period 15. Current flows through the series circuit comprising capacitor 17 and inductance 18 during the discharge time period because the capacitance and inductance are dissipating energy stored therein. Thereby, substantially the same force is applied to rotor 19 during each half of source 16 to enable proper synchronous motor operation to be attained.

In the transitional interval between the derivation of the maximum voltages by source 14 of time periods 15 and 16, current continues to flow in the series circuit comprising capacitance 17 and inductance 18 because of the inability of an inductance to undergo a sudden, step change in current and conduction of bipolar transistors 12 and 13 in the reverse or backward direction, i.e., positive current flows out of the transistor collector, due to a breakdown mechanism. Thereby, the current in the series circuit including excitation winding 18 is usually smooth in the transition period between closing of switching transistors 12 and 13.

To consider the operation of the system of FIG. 1, under one set of proper operating conditions, consideration is given to the waveforms of FIG. 2. In FIG. 2a, the turn-on time of transistor 12 during time period 15 is indicated by the duration of rectangular waveforms 23, while the turn-on time of transistor 13 during time period 16 is indicated by the duration of rectangular waveforms 24. The transitional time when neither transistor 12 nor transistor 13 is activated to a closed or conducting condition is indicated by the straight line 25 between rectangular wave segments 23 and 24. It is noted that transitional intervals 25 have equal time durations in each of time periods 15 and 16 and that the durations of each of turn-on times 23 and 24, while transistors 12 and 13 are in a closed switch position, are substantially the same.

For the situation illustrated by FIG. 2, the natural period of the drive circuit and excitation winding 18, as determined by the value of capacitor 17, the circuit resistance and the inductance and resistance of coil 18, relative to the frequency of source 14 is such that a sine-like wave is impressed on coil 18, whereby shaft 22 on rotor 21 of synchronous motor 19 is rotated at a constant velocity. This result is attained by utilizing a DC source 11 having a potential of 12 volts, a capacitor 17 having a capacity of 8 microfarads, and an excitation winding 18 having an inductance of approximately 2.8 henrys. The length of each of the time periods 15 and 16 is approximately one-sixtieth of a second and the duty cycle of transistors 12 and 13 during time periods 15 and 16 is on the order of 95 percent. Thereby, the natural frequency of the drive circuit and excitation winding 18 equals the frequency of source 14.

Under the stated conditions, the current flowing in the series circuit including capacitance 17 and inductance 18 has a substantially sinusoidal waveshape as indicated by FIG. 2b. The substantially sinusoidal waveshape has substantially zero value only at the beginning of each of time periods 15 and 16. It is noted from FIG. 2b that the current during each of time periods 15 and 16 flows in only one direction and that a single peak during each time period occurs. Further, between the beginning and end of each of the time periods the slope of the current waveshape is constantly changing. Further, the current waveshape between alternate peaks in successive time periods always slopes in the same direction and the slope always has a non-zero value. Current flows in the emitter collector paths of transistors 12 and 13 during transitional periods 25 because of the bias applied to the transistors by voltages developed in the series circuit including capacitor 17 and winding 18. During the half cycle of source 14, while transistor 12 is biased by the time reference source to a conducting state, current flows from DC source 11 to charge capacitor 17 and build up a field in winding 18. At the time transistor 12 is biased by source 14 to cut-off, in response to the trailing edge of waveform portion 23, current is flowing in winding 18 in a direction toward the lower end of the winding. In response to transistor 12 being biased to cut-off, there is a tendency for the magnetic field of winding 18 to collapse and produce a voltage that biases the emitter base path of transistor 13 into a conducting breakdown state, whereby current continues to flow in the same direction in the series circuit including winding 18 and capacitor 17. When the current reaches a zero level, half way through transitional period 25, the low impedance path through transistor 13 still exists so that energy stored in capacitor 17 and winding 18 can still fully circulate between them. Thereby, the direction of current flow reverses, i.e., current flows in a direction toward the upper end of winding 18 through capacitor 17 into the collector of transistor 13. When transistor 13 is switched on in response to the voltage of source 14 during time interval 24 the low impedance path is maintained and the sinusoidal-like discharge of energy in capacitor 17 and inductance 18 continues, whereby the current waveform of FIG. 2b is generated during waveportion 24. When transistor 13 is biased to cut-off by source 14, at the trailing edge of waveportion 24, current in winding 18 is flowing in an upward direction. Again there is a tendency for the field in winding 18 to collapse. The collapsing field is in the opposite direction from the previous half cycle, whereby the base emitter diode of transistor 12 is biased to a breakdown condition and current flows from winding 18 through capacitor and transistor 12 into the positive electrode of DC source 11. Current continues to flow through capacitor 17 and inductance in the opposite direction (toward the lower end of winding 18) after the midpoint of transitional period 25 and prior to the leading edge of waveportion 23 because of the bias applied to transistor 12 by voltages in the series circuit including the capacitor and winding. After the leading edge of waveportion 23 occurs transistor 12 is biased on and presents a low impedance to current from source 11 regardless of the voltages in the series circuit.

The continuous, smooth current waveform of FIG. 2b results despite the transient nature of current applied through transistor switch 12 to capacitor 17 and winding 18 during time period 15 and the alternate transient flow of current in the opposite direction through transistor 13 in response to discharge of energy from capacitor 17 and winding 18 during time period 16. If the stated criteria regarding the current waveshape in the series circuit including excitation coil 18 and capacitor 17 are not maintained the shaft of motor 19 does not run at constant rotational velocity, with resulting detrimental results.

The voltage across capacitor 17 for the circuit parameters of FIG. 2 is illustrated by FIG. 2c. In FIG. 2c, it is noted that the waveform of the voltage across capacitor 17 is substantially sinusoidal, with peak value occurring at boundaries between time periods 15 and 16. Positive peak values occur immediately after switch 12 is open circuited, while minimum peak values occur immediately after opening of transistor switch 13. The voltage between the positive and negative peak values is equal approximately to twice the voltage of DC source 11 because of the switching action of transistors 12 and 13 and the energy storing properties of capacitor 17 and inductance 18.

The waveform of FIG. 2c reveals that zero voltage across capacitor 17 occurs at a time displaced from zero current flowing in the circuit including capacitor 17 and inductance 18. This result occurs because of the phase lag introduced by the capacitor 17 relative to the inductance, resistance and switching time periods of the circuit. The waveforms illustrated by FIGS. 2b and 2c, of course, illustrate operation under steady state, rather than transient or starting, conditions.

Reference is now made to FIGS. 3a–3c of the drawings, illustrating waveforms of a circuit wherein the capacity of capacitor 17, the inductance of winding 18, and the periods 15 and 16 are such that the shaft 22 of motor 19 does not rotate at constant angular velocity, i.e., shaft 22 rotates in an uneven or jerky manner that causes rattle of a gear train driven thereby. The circuit producing the waveforms illustrated by FIG. 3 includes the same time reference source, a DC source having the same potential and same motor as discussed in conjunction with FIG. 2a, but a capacitor 17 having a capacitance of four microfarads.

Since the timing waveform of FIG. 3a is identical to that of FIG. 2a, no description thereof is presented. The current waveform of FIG. 3b, however, is quite different from that of FIG. 2b. It is noted that the current waveform of FIG. 3b includes wave segments of substantially the same shape during each of time periods 15 and 16. The waveshape during each of the periods, however, has a zero value during substantial, non-zero time period 26 prior to the termination of each of time periods 23 and 24. Because zero or no current flows in the circuit including capacitor 17 and inductance 18 for more than an instant during each half cycle of source 14, the current waveform of FIG. 3b does not have a constantly changing slope between the beginning and end of time periods 23 and 24. Further, the current waveforms between alternate positive and negative peaks, as illustrated in FIG. 3b, do not always slope in the same direction because of the zero slope during time interval 26. The abrupt change in slope of the current waveform at the beginning and end of each interval indicates that the waveshape of FIG. 3a cannot be considered analytic.

The voltage across capacitor 17 with the circuit configuration described in conjunction with FIG. 3 is illustrated in FIG. 3c. In FIG. 3c, it is noted that while current is flowing in the circuit including capacitor 17 and winding 18, the voltage across capacitor 17 is constantly changing, as indicated by waveform segment 27. During the time interval 26, the voltage across capacitor 17 is maintained constant, as indicated by waveform segments 28.

With a system operating in accordance with the waveforms of FIGS. 3a–3c, synchronous motor shaft 22 rotates a number of revolutions each second equal to the frequency of source 14, or a submultiple of the frequency of the source. This is because current pulses are supplied to excitation winding 18 at a precise frequency determined by the characteristics of reference time source 14. The rotational velocity of shaft 22 with the circuit parameters specified for FIGS. 3a–3c, is not constant, however. Instead, the motor shaft during each revolution accelerates and decelerates to cause wear to mechanical parts and other detrimental operating characteristics, as outlined supra.

Figure 4B:
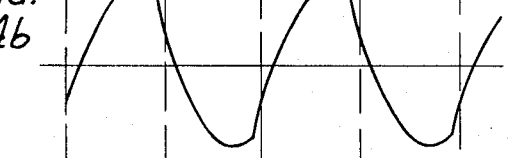

It is instructive to consider the operation of the circuit having the same parameters as indicated supra except for a capacitor 17 having a value of 20 microfarads. Waveforms for this configuration are illustrated by FIGS. 4a–4e. The waveform representing conduction times of transistors 12 and 13 in response to bias from source 14, illustrated in FIG. 4a, is identical to the waveforms of FIGS. 2a and 3a. The current waveform of the series circuit, illustrated in FIG. 4b, phase lags the current waveform of FIG. 2b by a few degrees but deviates slightly from the sinusoidal shape of FIG. 2b. The current waveshape has a constantly changing slope but a peak value that occurs slightly before the end of time periods associated with wave segments 23 and 24. The peak value in FIG. 4b occurs later than in FIG. 2b because of the longer time required to charge the larger valued capacitor. When reference time source 14 switches into transitional periods 25, current in the series circuit abruptly changes in slope; the current waveform, however, remains smooth throughout the transitional period and the following period 23 or 24 and has a constantly changing slope therein. Considering the percentage change in the value of capacitor 17 and change in phase of the current waveform is relatively insignificant. While proper operation is occurring the phase of the current in the series circuit is governed primarily by the switching time of transistors 12 and 13 in response to the bias voltage of source 14, rather than the values of impedances in the network. This is desirable because retention of waveshape and consistent operation over a wide range of values are thereby achieved. Another significant point derived from the waveshape of FIG. 4b is that current flows in the reverse or backward direction, i.e., out of the collector rather than into the collector, in transistors 12 and 13 at the beginning of each of the time periods associated with waveportions 23 and 24. This is illustrated in FIGS. 4d and 4e wherein the waveshapes of current flowing into the collectors of transistors 12 and 13 are respectively illustrated. The mechanism associated with the reverse current flow at the beginning of waveportions 23 and 24 is substantially the same as the reverse current flow mechanism described supra with regard to FIG. 2 during transitional periods 25. This very important mechanism might be said to be unexpected as when transistor 13 turns off and transistor 12 turns on power supply 11 is placed across the motor-condenser series circuit. It might be expected that the current at this time would instantly shift in direction of flow to a charge condition to cause an abrupt change in the motor current. Instead, when transistor 13 turns off the current flow in the motor coil 18 causes an instantaneous voltage rise in winding 18 to cause the voltage at the emitter of transistor 12 to rise to a value sufficient to break down the diode junction between the emitter and base of transistor 12 to permit current to flow backwards through transistor 12, i.e., positive current flows from the collector of transistor 12. The voltage at the emitter of transistor 12 rises by a small amount, sufficient to cause transistor base emitter breakdown but insufficient to cause deleterious effects, above the voltage of power supply 11 to permit the discharge current in the series circuit to continue to flow in the same direction from its value at the time transistor 13 turns off until said current reaches zero. When the current in the series circuit reaches a zero magnitude transistor 12 conducts to feed current from source 11 to the series circuit, thereby providing a smooth unbroken current-time wave. When transistor 13 turns off the discharge current in the series circuit flows backwards through transistor 12 to feed energy back to power supply 11, until zero current is reached, at which time charging current flows from power supply 11 through the collector to the emitter of transistor 12.

The same type of action occurs when transistor 12 turns off and charging current is still flowing. In this case the charging current continues due to induced voltage from the motor coil 18. The induced voltage generates a current that flows backwards out of the collector of transistor 13; thereby the charging current for the series circuit continues until the motor current reaches zero and discharge current then flows from the collector of transistor 13 to the emitter thereof. Thus, with the motor coil-condenser circuit natural frequency being lower than the frequency of source 14, current flows during each switch period in two directions to maintain a smooth current-time flow.

This bidirectional current during each switching period causes the average DC current from power supply 11 to be decreased, and efficiency increased, because the time the current flows from the power supply is decreased to less than 50 percent. Also, current fed from the series circuit back into the DC power supply 11 decreases the average current drawn from the power supply 11 during each cycle of reference time source 14. The principal advantage of bidirectional current flow in transistors 12 and 13 during each half cycle of reference time source 14, however, is to provide a smooth current-time wave during the switching periods without abrupt changes which would adversely affect the motor.

Figure 4C:
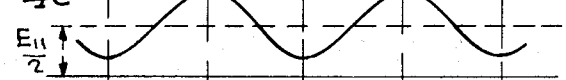
Figure 4D:
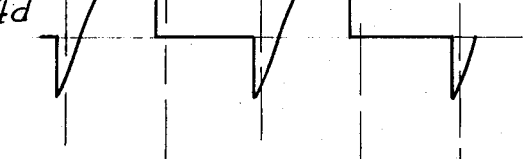
Figure 4E:
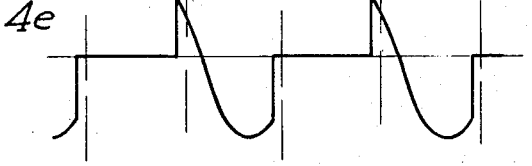

The voltage waveshape developed across 20 microfarad capacitor 17, illustrated in FIG. 4c, is substantially sinusoidal even though the current waveform deviates from a sinusoid. It has substantially a ninety degree phase lag relative to the drive voltage of source 14, FIG. 4a, similarly to the waveforms of FIGS. 2a and 2c. The amplitude of the AC voltage variations across a 20 microfarad capacitor 17 is considerably less than that across an 8 microfarad capacitor because the higher value capacitor cannot be charged and discharged as fast as the smaller capacitor.

In other experiments I conducted, it was found that by maintaining each of the circuit parameters stated supra constant, with the exception of capacitor 17, a boundary for sinusoidal-like current waveshapes and hence constant rotational velocity of synchronous motor shaft 22 exists at a value of capacitor 17 equal to 6 microfarads. From this experimental data, I have concluded that the natural frequency of the circuit including capacitor 17 and excitation winding 18 should be approximately equal to or less than the frequency of reference time source 14. The natural frequency of the circuit exciting and discharging winding 18 and capacitor 17 is calculated in a well-known manner as:

$$f = \frac{1}{2\pi} \sqrt{\frac{1}{LC} - \frac{R^2}{4L}}$$

where:
$f$ = the natural frequency,
$\pi$ = 3.1415926,
$L$ = the inductance of winding 18,
$C$ = the capacitance of capacitor 17, and
$R$ = the resistance of the charging and discharging networks.

The resistances of the charging and discharging networks are substantially equal, each including the resistance of winding 18 and the shunt conductance of capacitor 17. The charging network resistance includes the impedance of transistor 12, while it is in a conducting state, in series with DC source 11, while the resistance of the discharge network includes the impedance of transistor 13 while it is in a conducting state. The slight difference in the resistance of the two circuits is generally insufficient to cause any problems of proper circuit functioning. If the natural frequency of the circuit is greater than the frequency of source 14, the current flowing in capacitor 17 and inductance 18 during each half cycle reaches a zero value prior to the termination of each half cycle of source 14, to preclude constant rotational velocity of shaft 23.

While it might appear, from a theoretical viewpoint, that the value of capacitor 17 can increase without bound regardless of the relative value thereof to the inductance of coil or winding 18, this is not the case. In addition to the physical limitations on the size of capacitor 17 in an actual practical device, large values of capacitor 17 cause a reduction in the current supplied to excitation winding 18, as illustrated by FIG. 4c. For large values of capacitor 17, the rate at which current is supplied to coil 18 is materially decreased. The decrease in the rate of current being applied to coil 18 can be sufficiently great that the current magnitude in coil 18 never reaches a large enough value during a half cycle of source 14 to enable sufficient flux to be coupled to rotor 21 to enable the rotor to be driven. In addition to not supplying adequate flux to maintain rotor 21 in an operating condition, the current may also be insufficient to enable the motor rotor to be self-starting.

To provide an indication as to the magnitude of current supplied by a 7 volt DC source to excitation winding 18 having a 2.8 henry inductance with a 30 Hertz time reference source as a function of the value of capacitor 17, reference is made to FIG. 5 of the drawings. In FIG. 5, values of capacitance varying between 2 and 40 microfarads are given. Curve 29 indicates the RMS current drawn by excitation winding 18 as a function of the value of capacitor 17 while shaft 22 is free to turn. Curve 30, in contrast, provides a plot of RMS current supplied to excitation winding 18 as a function of capacitance, in situations wherein motor shaft 22 is locked in situ. It is noted from a comparison of curves 29 and 30 that a relatively large amount of current is available while shaft 22 is not turning to assist in motor starting. The larger current occurs because of the reduced impedance of excitation winding 18 while the motor is in static conditions, whereby a back E M F is not generated in coil 18 in response to rotation of the motor.

The more important aspect to note from FIG. 5, however, concerns the range at which the synchronous motor shaft 22 rotates with constant velocity. In particular, for values of capacitance between 6 microfarads and 34 microfarads rotor 22 turns with constant rotational velocity. For values of capacitance 17 less than and greater than the stated range, motor shaft 22 does not rotate at constant velocity and unsatisfactory performance results. It is noted that the amplitude of current flowing in excitation winding 18 is substantially the same at 6 and 34 microfarads. Satisfactory operation could not be produced at the low end of the capacitance range, regardless of the magnitude of the voltage of DC source 11, although satisfactory operation could be attained for capacitances greater than 34 microfarads by increasing the potential of source 11. Thereby, the failure of the system to perform adequately for values of capacitances less than six microfarads is definitely attributable to the nature of the waveform when the natural frequency of the excitation circuit is greater than the frequency of source 14. The very wide range of capacity variations illustrated in FIG. 5 enables capacitance 17 to be of the low tolerance type and enables the circuit to be employed over a wide temperature range.

According to a second embodiment of the invention constant rotational velocity of rotor 19 is achieved by designing continuously repetitive reference time source 14 so that the durations of the charging and discharging currents in capacitor 17 and winding 18 are different. Each of the unequal durations or periods (which always occur one immediately after the other) of the charging and discharging currents must, however, be such that a single peak current is derived in winding 18 during each half cycle of source 14, with the peaks in adjacent half cycles being oppositely directed. Further, the current waveform in winding 18 during each period substantially always has a constantly changing slope between the beginning and end of each time period. These waveform requirements are achieved by proper selection of the value of capacitor 17 and the duration of each period of time reference source 14 relative to the impedance of winding 18. In addition, the DC current flowing in winding 18 during each of the periods must be approximately the same so that approximately the same force is applied to rotor 19 during each half cycle of source 14, a result that can be attained by changing the period durations by as much as 20 percent relative to the equal period durations. In one circuit actually constructed a 15 percent change in the period duration was reflected in only about a 5 percent change in the current during each period.

It has been found through experimentation that the unequal successively occurring charging and discharging periods can take many different forms, viz: all of the charging periods can be the same predetermined duration longer or shorter than all of the discharge periods, in which cases a fixed duty cycle exists relative to the two half cycles of each cycle of source 14; the durations of the charging and discharging periods can be variable, as long as the average of the reciprocal of the duration of each charge period plus each discharge period is equal to or less than the natural frequency of the excitation circuit for winding 18 and equal to the desired excitation frequency for the winding (i.e., $$f \leq \frac{1}{T_1 + T_2} = f_d$$

where $f$ is defined supra,
$T_1$ = duration of each charge period,
$T_2$ = duration of each discharge period,
$f_d$ = desired drive frequency for rotor 19),
and provided the duration of each periods such that the excitation winding current has constantly changing slope during each period. The variable duty cycle of source 14 can change gradually or in steps progressing from a low to a high value and back to a low value; e.g., the duty cycle can vary gradually from 42.5 percent to 57.5 percent in 10 equal increments and return to 42.5 percent in 10 equal increments or in one step or it can dwell at a 42.5 percent level for five cycles, step to a 50 percent level for one or several cycles, jump to a 57.5 percent level for five cycles and then return gradually or in one step to 42.5 percent. The different duty cycles can be achieved by analog or digital shaping of the output of a single constant frequency oscillator included in source 14 or the source can include a pair of oscillators having outputs that are fed to analog or digital combining networks. Certain of sources 14, particularly those employing digital combining networks, may generate some transients consisting of frequency components much greater than the fundamental frequency of their output wave. While these transients may have a tendency to distort slightly the current waveform of winding 18, it has been found that if they are of sufficiently high frequency and low amplitude they have no appreciable effect on the constant rotational velocity of rotor 19.

To provide a more complete description and comparison of different duty cycle conditions, reference is made to the waveforms of FIG. 11. In FIG. 11, three different duty cycles are illustrated; FIG. 11a illustrates a square wave output of time reference source 14 whereby a fifty percent duty cycle for the supply of current by DC source 11 to winding 18 occurs, as illustrated by winding current waveform 101; FIG. 11b illustrates a rectangular wave output of time reference source 14 whereby a 42.5 percent duty cycle for the supply of current by DC source 11 to winding 18 occurs, as illustrated by current waveform 102; and FIG. 11c illustrates a rectangular wave output of time reference source 14 whereby a 57.5 percent duty cycle for the supply of current by DC source 11 to winding 18 occurs, as illustrated by current waveform 103. Waveforms 101-103 are for a 30 Hertz output of source 14, a 10 microfarad value of capacitor 17 and a motor having an inductance of 2.8 henrys.

Each of current waveforms 101-103 includes the basic criteria set forth with regard to the current waveforms of FIGS. 2b and 4b concerning a single peak, as well as constant and smooth variations during each half cycle of source 14. It is noted that break points in current waveforms 101-103 occur similarly to the break points of FIG. 4b and in alignment with the leading and trailing edge of the outputs of source 14 illustrated in FIGS. 11b-11d. The shapes of waveforms 102 and 103 during adjacent half cycles of source 14, however, are different because the durations of the charge and discharge currents are different in adjacent half cycles. During the period while transistor 12 is biased on by the upper portion of the waveform of FIG. 11c, there is a very short duration, low amplitude reverse current flowing from the collector of transistor 12 into DC power supply 11, as indicated by the portion of waveform 102 below the zero line and on the left side of FIG. 11a. While transistor 13 is biased on by the lower portion of the waveform of FIG. 11c, there is an appreciable reverse discharge current flow from the collector of transistor 13 through capacitor 17 to winding 18, as indicated by the portion of waveform 102 to the right of the break point thereof and above the zero line. In contrast, during the period while transistor 12 is biased on by the upper portion of the waveform of FIG. 11d, there is a longer duration, relatively high amplitude reverse current flowing from the collector of transistor 12 into DC power supply 11, as indicated by the portion of waveform 103 below the zero line and on the left side of FIG. 11a. While transistor 13 is biased on by the lower portion of the waveform of FIG. 11d, there is a very short duration, low amplitude reverse discharge current flow from the collector of transistor 13 through capacitor 17 to winding 18, as indicated by the portion of waveform 103 to the right of the break point thereof and above the zero line. As a result of the different values of reverse currents in transistors 12 and 13 during adjacent half cycles, the total or integrated currents in adjacent half cycles of waveforms 102 and 103 are approximately the same, being different from each other by less than three percent. The charging current in the first illustrated half cycle of waveform 103 has a higher initial negative value than that of waveform 102, so that the peak positive charging current of waveform 102 is substantially greater than that of waveform 103. Because of these factors the integrated values of the two current waveforms during the first half cycles indicated by the upper portions of the rectangular waveforms are approximately the same with the current of waveform 103 during the first half cycle being greater than that of waveform 102 by less than 3 percent even though the first half cycle of the waveform of FIG. 11b is 30 percent shorter than the waveform of FIG. 11c. The current waveforms 102 and 103 during the second half cycles indicated by FIGS. 11b and 11c are reversed from those during the first half cycles so that during the second half cycles the peak current of waveform 103 exceeds that of waveform 102 but the duration of the latter waveform exceeds that of the former. Because of all these factors, there is self compensation in each of the half cycles of waveforms 102 and 103 so that approximately the same force is applied without substantial transients to rotor 19 during each half and full cycle to enable it to rotate at constant angular velocity.

It has been found that constant rotational velocity of rotor 19 can be achieved if the duty cycle of source 14 is as low as 40 percent or as high as 60 percent, 20 percent changes relative to a 50 percent duty cycle. These wide changes in duty cycle can be tolerated because of the self compensating aspects of current flow during adjacent half cycles. In particular, as disclosed by FIG. 12 (a plot of output current of DC supply 11 versus duty cycle or percentage of time the DC supply feeds current to winding 18), the current supplied by DC source 11 to winding 18 for a 45 percent duty cycle is 3 percent less than the current for a 50 percent duty cycle, the DC current supply for a 55 percent duty cycle is substantially the same as a 50 percent duty cycle. As the duty cycle deviates to some percentage beyond 40 or 60 percent, constant rotational velocity is no longer attained because the current magnitudes during the different half cycles become excessively diverse and the length of each half cycle or period no longer conforms to the requirements anent constantly changing slope, single peak and smooth waveforms.

Figure 6:
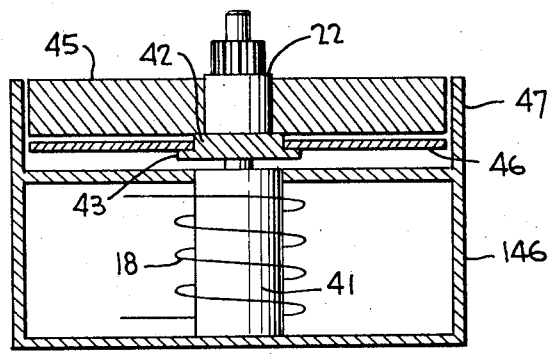
FIG. 6 is a side view of a typical motor of the type employed in the circuit of FIG. 1.

Reference is now made to FIG. 6 of the drawings wherein there is illustrated in sectional view one type of synchronous motor which can be employed with the circuit of the present invention. The motor illustrated in FIG. 6 is of the reaction type, but it is to be understood that hysteresis motors can also be employed.

The reaction motor illustrated in FIG. 6 includes a center magnetic core 41 having winding 18 wound thereon. mounted on core 41 is a boss 42 having a flange 43 extending from the lowest portion thereof. On the upper surface of boss 42 is rotatably mounted permanent magnet rotor 45, having a plurality of permanent magnet poles, as disclosed in my aforementioned patent. Positioned between the lower surface of rotor 45 and the upper surface of flange 43 is flywheel 46, fabricated of a nonmagnetic material, such as brass. Flywheel 46 is free to turn relative to rotor 45 to serve as an inertia disc assuring smooth rotation of the rotor slightly beyond the natural frequency of the drive circuit and to provide relatively low starting voltages for the synchronous motor in response to relatively low RMS currents fed to excitation winding 18. In circuits wherein the durations of the charge and discharge periods of current in winding 18 are unequal, it has been found that flywheel 46 is very important to achieve constant rotational velocity of rotor 19. Fixedly mounted on rotor 45 is shaft 22 that carries gear 44 for driving a suitable mechanical load, such as the hands of a clock.

Magnetic flux from the bottom and top of core 41 is coupled to rotor 45 by way of outer and inner field cups 146 and 47, respectively. Both of field cups 146 and 47 are fabricated from a magnetic material, with outer field cup 146 coupling magnetic flux from the bottom of core 41 to the periphery of rotor 45 via teeth (not shown) spaced about the rotor periphery. Flux from the upper end of center core 41 is fed to the periphery of rotor 45 via upwardly extending teeth on the inner field core. As illustrated and disclosed in my aforementioned patent, the teeth of inner and outer field cores 146 and 47 are spaced relative to each other and are positioned relative to the poles of permanent magnet rotor 45 in such a manner as to enable the rotor to be driven in response to flux variations occurring in response to changing currents in excitation winding 18.

Figure 7:
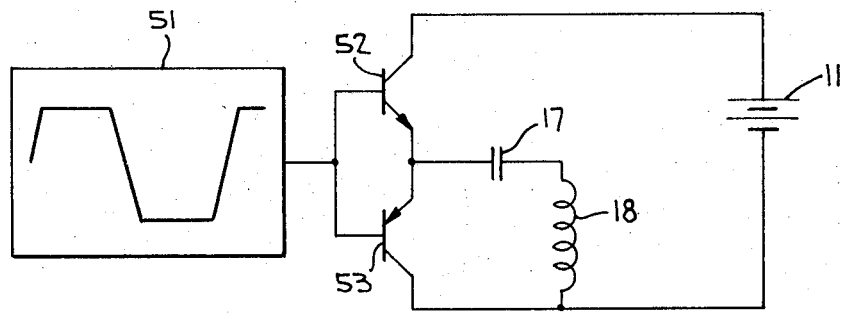

Reference is now made to FIG. 7 of the drawing wherein there is illustrated a modification of the basic circuit of FIG. 1. In the circuit of FIG. 7, reference time source 51 has essentially the same characteristics as the previously described reference time sources. The reference time source 51, however, includes only a single phase output, rather than a pair of complementary output phases, and drives a pair of complementary transistors 52 and 53. In the circuit of FIG. 7, however, reference time source 51 can be replaced with a pulsating source having an appropriate duty cycle and a DC supply for biasing one transistor to cut-off and the other to a conducting state. The DC source bias is periodically overcome by the voltage of the pulsating source so that neither transistor conducts at the same time.

NPN transistor 52 includes a collector electrode connected to the positive terminal of DC source 11, while the collector of PNP transistor 53 is connected to the negative electrode of source 11. The emitters of transistors 52 and 53 are connected together, as are the bases thereof which are driven in response to the output of reference time source 51. The emitters of transistors 52 and 53 have a common connection to one electrode of capacitor 17, having another electrode which is connected to one terminal of excitation coil 18. The other terminal of excitation coil 18 is connected to the collector of transistor 53.

The relative values of capacitor 17, the inductance of excitation winding 18, and the period of reference time source 51 in the circuit of FIG. 7 are identical to those of the previously described circuits. The operation of the circuit of FIG. 7 is also essentially identical to that previously described because complementary transistors 52 and 53 are driven into conducting and nonconducting states during alternate time periods of time reference source 51 due to the complementary nature of the switching transistors. In particular, transistor 52 is turned on to conduct current from source 11 to capacitor 17 and excitation winding 18 while transistor 53 is cut off. Thereafter, transistors 52 and 53 are both cut off by source 51 but current continues to flow in excitation winding 18 for a short time interval because of bias applied to the transistors by voltages in the series circuit including winding 18 and capacitor 17. After the short time interval has terminated, transistor 53 is rendered conductive and transistor 52 is cut off so that current in capacitor 17 and coil 18 flows in the opposite direction from the direction in which it was flowing while transistor 52 was conducting. The waveshapes during the two half cycles of time reference source 51 are substantially as previously described and are such that the shaft 22 of motor 19 rotates with constant angular velocity. If the two half cycles have the same duration the waveshape during each is substantially the same because the impedance of the discharge path including transistor 53 is essentially the same as the impedance of the charging path including source 11 and transistor 52. Any differences between the charging and discharge paths are so slight as to have virtually no effect on flux coupled to rotor 21 for each half cycle.

Figure 8:
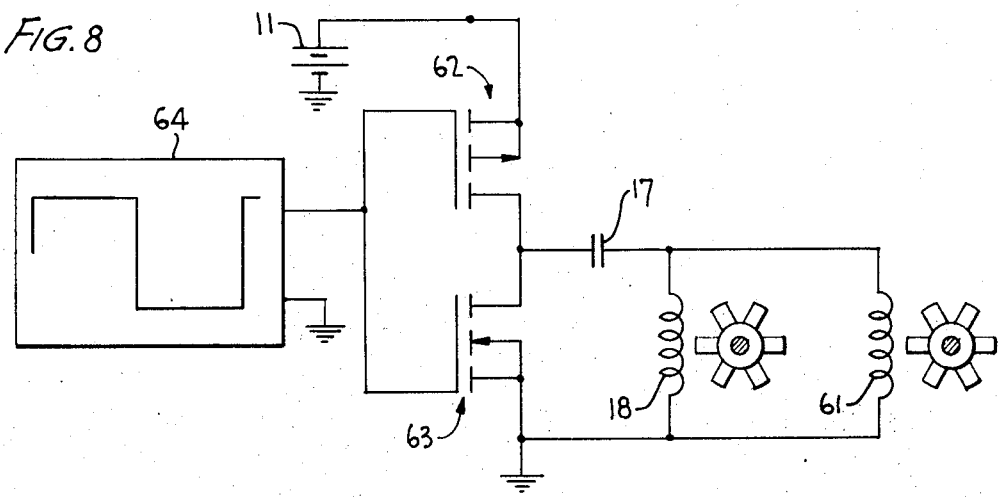

Reference is now made to FIG. 8 of the drawings wherein there is illustrated another embodiment of the present invention. In the embodiment of FIG. 8, capacitor 17 and winding 18 are series connected in the same manner as illustrated and described with regard to FIGS. 1 and 7. Connected in shunt with excitation winding 18 is winding 61, the excitation winding for a synchronous motor remotely located from the synchronous motor responsive to winding 18. In an automobile, excitation winding 61 may be provided for a clock motor mounted on the rear seat. The combined impedance (inductance and resistance) of excitation windings 18 and 61 is selected relative to the capacitance of capacitor 17 to enable smooth current waveshapes during each switching period, as described in conjunction with FIGS. 2, 4 and 11, to be attained.

In FIG. 8, metal oxide semiconductor field effect transistors (MOSFET) 62 and 63 are connected between the positive electrode of DC power supply 11 and ground. The source electrode of P-channel MOSFET 62 is connected directly to the positive terminal of source 11, while the source electrode of N-channel MOSFET 63 is connected to ground. The drain electrodes of MOSFET's 62 and 63 have a common connection, to one electrode of capacitor 17. The gate electrodes of complementary MOSFET's 62 and 63 are responsive to the output of time reference source 64, which may have a square or rectangular wave output as described previously.

The waveforms derived with the circuit of FIG. 8 for current flowing in excitation windings 18 and 61 are substantially the same as discussed supra in conjunction with bipolar transistors. The mechanism involved in current conducting through the excitation windings is slightly different, however, from that previously discussed, particularly with regard to circuit configurations wherein the natural frequency of the circuit including capacitor 17 and windings 18 and 61 is greater than the frequency of source 64. Under such circumstances, current conduction through MOSFET's 62 and 63 at the beginning of each half cycle of source 64 relies upon the bidirectional current carrying ability of the MOSFET's once they have been triggered into a conducting state. The MOSFET's are incapable of breakdown between the drain and gate electrodes and must rely upon gating voltages from source 64 to render them alternately into conducting and cut-off states.

Figure 9:
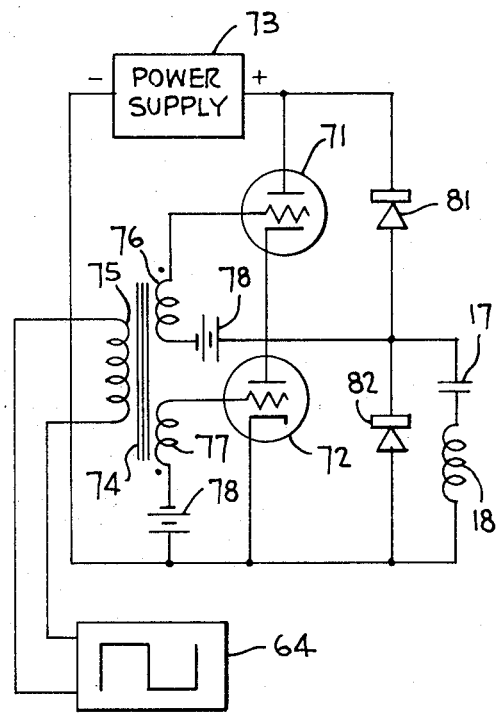
FIGS. 7–10 are modifications of the circuit of FIG. 1.

Reference is now made to FIG. 9 of the drawings wherein there is illustrated still another modification of the present invention. In the circuit of FIG. 9, the transistors of FIGS. 1, 7 and 8 are replaced by vacuum tube triodes 71 and 72 which function as switches. Triodes 71 and 72 are series connected with each other, whereby the cathode of triode 71 is connected to the anode of triode 72 and the anode of triode 71 is connected to the positive electrode of DC power supply 73, the negative electrode of which is connected to the cathode of triode 72. The grids of triodes 71 and 72 are responsive to opposite polarity gating voltages as coupled thereto by reference time source 64 via transformer 74. Transformer 74 includes a primary winding 75 connected directly across output terminals of reference time source 64, as well as secondary windings 76 and 77. Secondary windings 76 and 77 are wound in opposite directions whereby conduction of tube 71 occurs while tube 72 is cut off and vice versa. To establish proper bias levels for the grid cathode paths of triodes 71 and 72, DC biasing sources 78 are provided.

The common connection between the cathode of triode 71 and the anode of triode 72 is connected to ground through the series circuit including capacitor 17 and excitation winding 18. As with the embodiments of the previously described figures, the natural frequency of the series circuit including capacitor 17 and winding 18 is equal to or less than the frequency of source 64 to enable substantially the sinusoidal currents to be generated in winding 18.

Triodes 71 and 72 are unidirectional current conducting devices, i.e., they can conduct in only one direction, from the anode to the cathode. Under many circumstances, however, there is a requirement for current to flow in the opposite direction through switches comprised of triodes 71 and 72 to enable smooth, sinusoidal-like currents to flow in winding 18; note the waveforms of FIG. 4. To solve this problem, the anode cathode paths of triodes 71 and 72 are shunted by diodes 81 and 82. Diodes 81 and 82 are together poled in the same direction, but in an opposite manner from the current conducting direction of the triodes with which they are connected in shunt. Thereby, the anodes of diodes 81 and 82 are connected to the cathodes of triodes 71 and 72, respectively, while the cathodes of diodes 81 and 82 are connected to the anodes of the triodes. The diodes 81 and 82 do not normally conduct current because of the biases applied thereto by power supply 73 except during the brief period immediately after transitions in the waveform of source 64. During the stated brief interval diodes 81 and 82 are alternately rendered into a conducting state in response to bias applied thereto by voltages generated in the series circuit comprising capacitor 17 and winding 18 to allow current to flow in shunt with the cathodes and anodes of tubes 71 and 72 in excitation winding 18.

Figure 10:
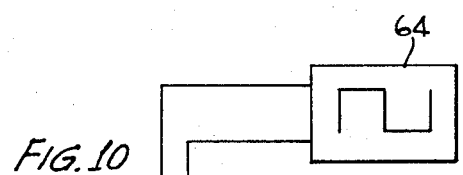

In accordance with still another embodiment of the invention, the electronic switches of FIGS. 1 and 7-9 are replaced with electromechanical switch 91 is illustrated in FIG. 10. The electromechanical switch of FIG. 10 is of the double pole, single throw type and includes an excitation winding 92 responsive to the reference time source 64. In addition, switch 91 includes a contact 93 driven by excitation winding 92 between contacts 94 and 95. Connected to contact 93 is a series circuit including capacitor 17 and excitation winding 18. The natural frequency of the excitation circuit for capacitor 17 and excitation winding 18 must be equal to or less than the switching frequency of source 64. Contact 94 is connected to the positive electrode of DC source 96, while contact 95 and one terminal of the series circuit including capacitor 17 and winding 18 are connected to the negative electrode of the DC source. Connected in shunt with contacts 94 and 93 is diode 97, while diode 98 is connected in shunt with contacts 93 and 95. Diodes 97 and 98 are poled in opposite directions relative to contact 93, whereby the cathode of diode 97 is connected to contact 93 and the anode of diode 98 is connected to contact 93.

In response to the square or rectangular wave voltage derived from reference time source 64, excitation winding 92 vibrates or oscillates contact 93 between contacts 94 and 95 at a fixed frequency. Because contact 93 is of the electromechanical, rather than electronic, type, a finite time period is required for it to travel between contacts 94 and 95. Thereby, an open circuit exists in the series circuit including capacitor 17 and excitation winding 18 through contact 93 while the contact travels between stationary contacts 94 and 95. As indicated supra with regard to FIG. 4, however, under normal preferred operation, a finite current exists in winding 18 each time switch 93 is traveling between contacts 94 and 95. The finite current in coil 18 while contact 93 is traveling between contacts 94 and 95 would normally prevent a smooth sinusoidal-like current waveform from being derived in the excitation winding. Diodes 97 and 98 enable a low impedance path around contact 93 to be established while the contact is traveling between the stationary contacts 94 and 95. Thereby, the same result is achieved with the circuit of FIG. 10 as discussed supra with regard to FIGS. 1 and 7-9.

While there have been described and illustrated several specific embodiments of my invention, it will be clear that variations in the details of the embodiments specifically illustrated and described may be made without departing from the true spirit and scope of the invention as defined in the appended claims. For example, the series circuit including capacitor 17 and winding 18 could be connected between the apices of a bridgelike switch including two branches connected across the electrodes of a DC source. In each branch, there is provided a pair of switches, such as bipolar transistors having series connected emitter collector paths. The switches in each branch are activated by a reference time source so that only one switch in each branch is conducting at a time. While a switch in one branch is conducting a switch in the other branch conducts to establish oppositely directed current paths between the positive and negative electrodes of the DC source through the excitation winding during each cycle of the reference time source. In addition to the oppositely directed current paths established through the excitation winding in response to bias voltages generated by the reference time source, reverse current usually flows through the switches as described with regard to FIG. 4.

I claim:

1. A system for driving a synchronous motor, having an excitation winding means, from a DC source and a time reference source means, said motor being driven at constant rotational velocity over a possible wide range of component values relative to nominal values thereof, comprising: capacitance means connected in series circuit with said winding; switch means controlled in response to said time reference source for alternately connecting said series circuit (a) to be responsive to said DC source during a first time period of said time reference source so that a single peak current amplitude is derived in said series circuit during said first period, and (b) in a path during a second time period of said reference source so that a single peak current amplitude is derived in said series circuit during said second period, said first and second time periods immediately following one after the other, said two peak currents being oppositely directed; the capacity of the capacitance means, inductance of the winding means and the length of each of said periods of said time reference source means being such that current in the series circuit has a waveform always having a changing slope between the beginning and end of each of said time periods and the maximum voltage across the capacitance means during each of the periods is less than the voltage of the DC source for all of said range of component values.

2. The circuit of claim 1 wherein said switch means includes first and second switching elements connected in another series circuit across opposite polarity terminals of the DC source, and means, including the time reference source, for activating said first switching element into a conducting state while activating the second switching element into a cut-off state and for activating said second switching element into a conducting state while activating the first switching element into a cut-off state.

3. The circuit of claim 2 wherein each of said switching elements is a transistor of the same conductivity type.

4. The circuit of claim 2 wherein each of said switching elements is a transistor of the opposite conductivity type.

5. The circuit of claim 2 wherein each of said switching elements is a bipolar transistor.

6. The circuit of claim 2 wherein each of said switching elements is a metal oxide semiconductor field effect transistor, and the time reference source applies gating voltages to the transistors so that one transistor is activated into a conducting state as the other transistor is being driven to cut-off.

7. The circuit of claim 2 wherein each of said switching elements includes: a first unidirectional conducting device, each of said devices having a control electrode responsive to said means for activating, a second unidirectional device shunting the first unidirectional device poled to pass current from the series circuit in the opposite direction from the first unidirectional device, said second device being rendered conductive in response to the voltage developed across it by the series circuit.

8. The circuit of claim 1 wherein the switch means includes a bidirectional conducting device having: a first terminal connected to one electrode of the DC source, a second terminal connected to a second electrode of the DC source and one end of the series circuit, and an electromechanical switching element responsive to the time reference source for successively and alternately connecting said first and second terminals to the other end of the series circuit, first diode means connected between the other end of the series circuit and said first terminal for enabling current to flow between the one end of the series circuit and the first terminal only in a first direction, and second diode means connected between the other end of the series circuit and said second terminal for enabling current to flow between the one end of the series circuit and the second terminal only in a second direction, said first and second directions being opposite to each other.

9. The combination of claim 1 further including a flywheel freely mounted about said shaft to form an inertia disc for the shaft.

10. The circuit of claim 1 wherein the durations of at least some of said first and second time periods differ from each other, the relative durations of said periods changing over number of cycles of the source so that the average durations of the first and second periods are substantially equal, and further including a flywheel freely mounted on the shaft to form an inertia means for the shaft.

11. The circuit of claim 1 wherein the durations of said first and second time periods are substantially the same.

12. A combination adapted to be driven by a DC power source comprising: synchronous motor means having excitation winding means; a time reference source generating an output having a predetermined frequency; a capacitor connected in series circuit with said winding means; said capacitor and winding means having a possible wide range of values relative to nominal values thereof; circuit means responsive to the time reference source and DC power source for causing currents derived from the DC power source and having opposite polarity peak amplitudes and a waveform with always changing slope to flow in said series circuit during alternate half cycles of the time reference source, the nominal value of the capacitor being such that the natural frequency of said series circuit is less than the frequency of the time reference source over said range of values, whereby the motor is driven at constant rotational velocity over said range of values, the value of said current being sufficiently great to provide self starting for the motor means.

13. The combination of claim 12 wherein the synchronous motor means includes a plurality of excitation windings connected in parallel with each other, each of said windings being coupled in exciting relationship with a different synchronous motor rotor.

14. The circuit of claim 12 wherein the motor means includes an output shaft and further comprising an automobile clock indicating means, and gear means connecting the shaft to drive the indicating means, said clock being capable of operating over a temperature range of between approximately −40°F. and +175°F., said components having low tolerances and not being temperature compensated.

15. A circuit for energizing excitation winding means of synchronous motor means from a DC source at a frequency determined by the frequency of a periodic source comprising a capacitor connected in series circuit with said winding means, said capacitor and winding means having a possible wide range of values relative to nominal values thereof, the nominal value of the capacitor being such that the series circuit has a natural frequency less than the frequency of the periodic source over said range of values, switch means responsive to the periodic source for alternately connecting at the frequency of the periodic source said series circuit with the DC source so that currents having opposite polarity, substantially instantaneous peak amplitudes and a waveform with always changing slope flow in the series circuit during alternate half cycles of the periodic source, peak voltages developed across said capacitor during each half cycle being less than the voltage of the DC source applied to the series circuit, said switch means including means for conducting current during each half cycle in a direction opposite to the direction of the peak amplitude current during the half cycle.

16. The circuit of claim 15 wherein the switch means includes a pair of switching elements each having a control electrode, said periodic source being a square wave reference time source connected to said control electrodes for alternately activating only one of the switching elements into a conducting condition at a time, each of said switching elements having bidirectional current carrying capabilities when actuated into a conducting condition in response to the periodic source, each of said switching elements being actuated into a conducting condition substantially simultaneously with the other switching element being cut off.

17. The circuit of claim 16 wherein each of the switching elements is a field effect transistor.

18. The circuit of claim 15 wherein the switch means includes a pair of switching elements each having a control electrode, said periodic source being a reference time source connected to said control electrodes for alternately actuating only one of the switching elements into a conducting condition at a time, each of said switching elements including unidirectional current conducting means rendered into a conducting state only in response to voltages generated in the series circuit for conducting the current during each half cycle opposite to the direction of the peak amplitude current during the half cycle.

19. The circuit of claim 18 wherein each of the switching elements comprises a bipolar transistor.

20. The circuit of claim 18 wherein each of the switching elements comprises: a unidirectional current carrying device having the control electrode, a diode shunting the device, said diode and element being poled and connected to said series circuit to conduct current flowing in the series circuit in opposite directions.

21. The circuit of claim 15 wherein the switch means includes a bidirectional conducting device having: a first terminal connected to one electrode of the DC source, a second terminal connected to a second electrode of the DC source and one end of the series circuit, and an electromechanical switching element responsive to the periodic source for successively and alternately connecting said first and second terminals to the other end of the series circuit, first diode means connected between the other end of the series circuit and said first terminal for enabling current to flow between the one end of the series circuit and the first terminal only in a first direction, and second diode means connected between the other end of the series circuit and said second terminal for enabling current to flow between the one end of the series circuit and the second terminal only in a second direction, said first and second directions being opposite to each other.

22. The combination of claim 15 wherein the synchronous motor means includes a plurality of excitation windings connected in parallel with each other, each of said windings being coupled in exciting relationship with a different synchronous motor rotor.

23. A system for driving a synchronous motor having an excitation winding means from a DC source and a time reference source means, said motor being driven at constant rotational velocity over a possible wide range of component values relative to nominal values thereof, comprising: capacitance means connected in series circuit with said winding; switch means controlled in response to said time reference source for alternately connecting said series circuit (a) to be responsive to said DC source during a first time period of said time reference source so that a single peak current amplitude is derived in said series circuit during said first period, and (b) in a path during a second time period of said reference source so that a single peak current amplitude is derived in said series circuit during said second period, said first and second time periods immediately following one after the other, said two peak currents being oppositely directed; the capacity of the capacitance means, inductance means of the winding and the length of each of said periods of said time reference source means being such that: current in the series circuit has a waveform always having a changing slope between the beginning and end of each of said time periods, there is a substantial current flowing in the circuit at the end of each period, and the maximum voltage across the capacitance means during each of the periods is less than the voltage of the DC source for all of said values; and means for providing a discharge path for said substantial current.

24. The circuit of claim 23 wherein the durations of at least some of said first and second time periods differ from each other, the relative durations of said periods changing over a number of cycles of the source so that the average durations of the first and second periods are substantially equal, and further including a flywheel freely mounted on the shaft to form an inertia means for the shaft, whereby a shaft of the motor means is driven with constant rotational velocity.

25. The circuit of claim 23 wherein the durations of at least some of said first and second time periods differ from each other, the relative durations of said periods changing over a number of cycles of the source so that the average durations of the first and second periods are substantially equal, and further including a flywheel freely mounted on the shaft to form an inertia means for the shaft, whereby a shaft of the motor means is driven with constant rotational velocity.

26. The circuit of claim 23 wherein the durations of said first and second time periods are substantially the same, whereby a shaft of the motor means is driven with constant rotational velocity.

* * * * *